(12) United States Patent
Hammonds

(10) Patent No.: US 8,267,108 B2
(45) Date of Patent: Sep. 18, 2012

(54) ADDITIVE DISPENSING SYSTEM AND METHOD

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 478 days.

(21) Appl. No.: 12/573,751

(22) Filed: Oct. 5, 2009

(65) Prior Publication Data

US 2010/0084022 A1    Apr. 8, 2010

Related U.S. Application Data

(60) Provisional application No. 61/195,159, filed on Oct. 3, 2008.

(51) Int. Cl.
*E03B 1/00*    (2006.01)

(52) U.S. Cl. . 137/9; 137/87.02; 137/87.04; 137/101.25; 137/101.31; 141/104; 222/17; 222/56

(58) Field of Classification Search ........... 137/9, 87.02, 137/87.04, 101.25, 101.31, 205, 205.5, 206; 141/26, 100, 104; 222/17, 56, 133, 145.5, 222/205

See application file for complete search history.

(56) References Cited

U.S. PATENT DOCUMENTS

| | | | |
|---|---|---|---|
| 1,213,978 A | | 1/1917 | Thornton |
| 1,883,139 A | * | 10/1932 | Walter ..................... 137/101.25 |
| 2,351,579 A | * | 6/1944 | Beckman .......................... 137/7 |
| 2,362,607 A | * | 11/1944 | Albertson .................... 137/99.5 |
| 2,845,950 A | * | 8/1958 | Wadsworth .................... 137/154 |
| 3,807,434 A | | 4/1974 | Rasmussen et al. |
| 3,996,954 A | | 12/1976 | Monnet |
| 4,244,494 A | | 1/1981 | Colgate et al. |
| 4,407,315 A | | 10/1983 | Haberer |

(Continued)

FOREIGN PATENT DOCUMENTS

EP    1012450 B1    6/2000

(Continued)

OTHER PUBLICATIONS

Blaine R. Copenheaver, International Preliminary Report on Patentability—PCT/US2009/059561, Apr. 5, 2011, 7 pages, United States Patent and Trademark Office as International Search Authority, Alexandria, Virginia.

(Continued)

*Primary Examiner* — Craig Schneider
*Assistant Examiner* — Jessica Cahill
(74) *Attorney, Agent, or Firm* — James E. Hudson, III; Crain, Caton & James, P.C.

(57) ABSTRACT

A liquid metering device that dispenses liquid into an adjacent reservoir at a precise ratio relative to the total volume of the adjacent reservoir as the reservoir is filled with liquid. The hydrostatic dispensing system includes an additive reservoir, a calibrated dispensing vessel, a hydrostatic pressure chamber, and a three-way valve that passively arms and dis-arms the system. The precise dispensing of liquid by a calibrated dispensing vessel into the adjacent reservoir is accomplished entirely through the management and arrangement of hydrostatic pressure creating a liquid piston generated by the addition of liquid to the adjacent reservoir and its subsequent application to the liquid in the calibrated vertical column that displaces the calibrated volume of liquid into the reservoir at the same rate that liquid is added to the reservoir.

20 Claims, 4 Drawing Sheets

U.S. PATENT DOCUMENTS

| | | | |
|---|---|---|---|
| 4,596,277 A * | 6/1986 | Djordjevic | 141/98 |
| 4,727,827 A * | 3/1988 | Hoffman et al. | 123/1 A |
| 4,971,118 A | 11/1990 | Cluff | |
| 5,005,601 A | 4/1991 | Strong | |
| 5,331,994 A * | 7/1994 | Bryan et al. | 137/1 |
| 5,353,957 A | 10/1994 | Campau | |
| 5,406,995 A * | 4/1995 | Gantzer | 141/325 |
| 5,409,135 A | 4/1995 | Campau | |
| 5,685,334 A | 11/1997 | Hagan | |
| 5,919,360 A | 7/1999 | Contaxis et al. | |
| 5,992,473 A | 11/1999 | Hammonds | |
| 6,276,310 B1 * | 8/2001 | Backes et al. | 123/1 A |
| 6,942,124 B2 | 9/2005 | Dehn et al. | |
| 7,066,353 B2 | 6/2006 | Hammonds | |
| 7,156,991 B2 | 1/2007 | Herman et al. | |
| 7,216,681 B2 | 5/2007 | Valentine et al. | |
| 7,428,890 B2 * | 9/2008 | Lay et al. | 123/198 A |
| 2006/0180537 A1 | 8/2006 | Loftis et al. | |

FOREIGN PATENT DOCUMENTS

GB    2258413    2/1993

OTHER PUBLICATIONS

International Search Report and Written Opinion of PCT/US2009/059561 dated Dec. 3, 2009.

* cited by examiner

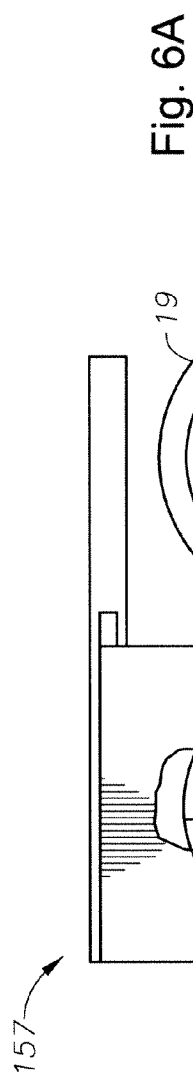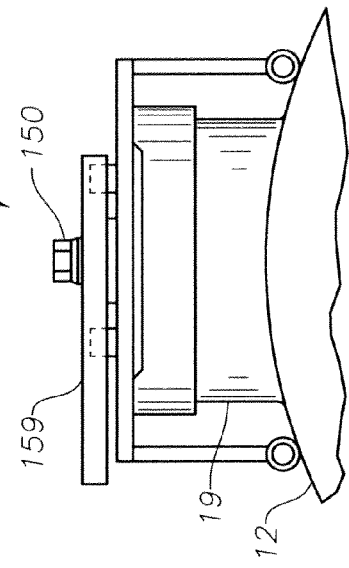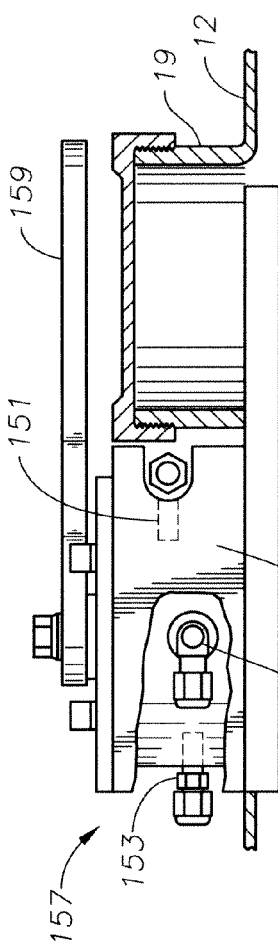

ADDITIVE DISPENSING SYSTEM AND METHOD

CROSS REFERENCE TO RELATED APPLICATION

This application is based upon provisional application 61/195,159 filed on Oct. 3, 2008, which is incorporated herein by reference and the priority of which is claimed.

BACKGROUND OF THE INVENTION

1. Field of the Invention

This invention relates to an additive dispensing system which may be used for dispensing additive fluid into a storage tank while the storage tank is being filled with fluid. Specifically the invention relates to an additive dispensing system that requires no electrical power to pump additive into a tank. The invention finds application for fuel additive systems for fuel tanks of trucks and any equipment that has a fuel tank to which mileage enhancing additives can be added. The invention also find application for adding corrosive additives such as chlorine to tanks so as to avoid corrosion to pumps, etc.

2. Background Art

Additive dispensing systems usually require external electrical power for operation. The power is used to energize various types of pumps, meters, level sensors and controls that cause the system to add an additive to a tank in proportion to the fluid, e.g., fuel, being added to the reservoir tank.

FIG. 1 illustrates such a prior art system. Proportionality is achieved by metering both the fluid (10) being loaded into the reservoir (12) and the fluid (20) being dispensed by an injector. Electronic signals from both meters (14, 24) are monitored and tabulated by a PLC (programmable logic controller) (30) which, in conjunction with pre-programmed formulas, calculate pump performance requirements and send electrical power to a variable speed pump (32) by means of a compound loop controller. The speed of the delivery pump (32) is determined by pulses received from both additive and product meters (14, 24) which are calculated and processed by the on-board PLC (30).

Such systems are very complex, are in most cases fragile, and are subject to stray electrical interference typically found on highway trucks. In many cases, vehicle manufacturers will void their warranties if foreign equipment is installed that could pose a threat to the integrity of the vehicle's on-board systems. Constant vibration, variable temperatures, harsh environments and inconsistent operator interfaces can make such systems undependable which significantly diminishes fuel economy and performance of the vehicle.

Another example of prior art, is a system that measures fluid volume either by means of weight or some version of a level indicator (16) of fluid (10) in the tank (12) to be additized. FIG. 2 illustrates such a prior art system. After the tank (12) is filled, and the volume measured, a calculated volume of additive (20) is then dispensed by means of a processor (30) and variable speed pump (32). Such systems are subject to failure due to the delicate nature of tank level measuring devices (16) when subjected to constant vibration found on various commercial vehicles. Like the meter paced system of FIG. 1, these systems are expensive and require interface with vehicle systems.

Fixed rate delivery systems such as described in FIG. 3, which may be powered by air or electricity, depend on operator judgment in order to assure proper dosage when fuel is added to a fuel tank (12), since the systems operate at a fixed delivery rate and must be activated manually by the operator fueling the vehicle. Since fueling rates of flow vary significantly from station to station, it is impossible for this type of system to meter the additive proportionately.

In general, previous and current devices available to the trucking industry is often too expensive relative to the fuel savings realized by additive injection and in addition, require high levels of maintenance with unacceptable levels of dependability. All conventional additive systems employ various pumps which in most cases depend on the integrity of valves, seals, diaphragms, piston seals and other dynamic seals for efficient operation requiring high levels of maintenance and incidence of failure or out-of-specification performance.

IDENTIFICATION OF OBJECTS OF THE INVENTION

A primary object of the invention is to provide an additive dispensing system that eliminates the complexities and lack of dependability of the prior art systems described above.

Another object of the invention is to provide an additive dispensing system that provides precise ratio injection of an additive into a tank using pressure forces available from the tank itself.

Another object of the invention is to provide an arrangement of valves, tubes, hydrostatic chamber and vertical column which dispenses liquid into a larger volume reservoir without the need of electricity, air or other external power whatsoever.

Another object of the invention is to provide an arrangement for injection of fluid into larger volume reservoirs without the use of any moving parts, pumps or dynamic seals.

Another object of the invention is to provide an extremely simple arrangement which is capable of accurate, repeatable delivery of additive liquid into a larger volume of liquid.

Another object of the invention is to provide a system which dispenses fluids at a precise ratio into larger volume of liquid passively without the need for an operator to "turn on" or "turn off" the system with the result that the system provides an extremely dependable, consistent method for delivering a precise ratio for blending additive fluids into larger volumes of fluids without depending on an operator interface.

Another object of the invention is to provide a simple method with which to adjust the ratio of fluid being blended into a larger fluid volume without mechanical means.

Another object of the invention is to provide a low cost arrangement for precise ratio dispensing of additive liquids into a larger volume of liquid.

Another object of the invention is to provide a system to handle volatile, dangerous additives that may be corrosive and aromatic where the system utilizes no dynamic seals or moving parts to dispense the additive.

Another object of the invention is to provide an intrinsically safe arrangement which precisely dispenses various fluids such as additives into larger volumes of liquids.

Another object of the invention is to provide a method for precisely dispensing various fluids such as additives without invasive interface with host system components such as electrical and pneumatics systems of vehicle or diesel equipment for example.

Another object of the invention is to provide an additive arrangement whereby an over-the-road truck driver may purchase fuel at various fuel suppliers along the road and be assured that a desired additive is consistently and accurately injected while the truck is being fueled without concern that he may add too much or too little to the fuel tank or that fuel may go untreated all together as a result of his error.

SUMMARY OF THE INVENTION

The objects identified above along with other features and advantages are incorporated in an arrangement for dispensing additive fluid into a fluid storage tank.

A dispensing vessel, preferably a vertical column, is provided having a gross displacement reflecting a pre-determined ratio to the volume of a fluid reservoir such as a fuel tank. The vessel or column has a vertical height exactly the same as that of the adjacent fluid reservoir and is positioned with the top and bottom of the vertical column being precisely aligned with the top and bottom of the adjacent reservoir. The vertical column is filled with fluid that is to be added to the adjacent reservoir by means of an additive storage tank that is positioned so that the bottom of the additive storage tank is at least as high as the top of vertical column. The top of the vertical column is connected to the bottom of the adjacent storage tank by means of a fluid line having included therein a hydrostatic chamber, preferably having a diameter greater than the diameter of the vertical column. An additional liquid line selectively connects the bottom of the vertical column to the additive storage tank or to an inlet fitting located at the top of the adjacent reservoir.

When fluid is added to the adjacent fuel reservoir, hydrostatic pressure is exerted at the bottom of the hydrostatic chamber equal to the pressure exerted in the tank by the liquid column height of the tank. Since the hydrostatic chamber is sealed and connected to the vertical column which is full of fluid, the small amount of fluid present in the bottom of the hydrostatic chamber acts as a fluid piston, which, being acted upon by the pressure exerted by the static head in the adjacent reservoir generates static pressure in the area above the fluid level in the hydrostatic chamber and line that leads to the top of the vertical chamber. Since fluid is not compressible, as static head increases in the reservoir, so does pressure within the chamber. The pressure exerted in the hydrostatic chamber forces the fluid in the vertical column down through the bottom port of the column, through the liquid line and up to the top of the adjacent fuel storage tank where it is dispelled into the open reservoir.

The rate of discharge of the vertical column into the adjacent tank is directly proportional to the static pressure exerted by the vertical column height of the liquid in the adjacent reservoir.

BRIEF DESCRIPTION OF THE DRAWINGS

The invention is described in detail hereinafter on the basis of the embodiments represented in the accompanying figures, in which:

FIG. 6A is a top view, partially cutaway, of the three-way activation valve assembly of FIG. 4 mounted on the top of the receptacle adjacent to the fill opening according to a preferred embodiment of the invention, showing three ports which direct the additive from the additive tank to the calibrated vertical column while isolating the reservoir and conversely direct additive from the vertical column to the reservoir while isolating the additive tank;

FIG. 6B is a side view, partially cutaway, of the three-way valve assembly of FIG. 6A;

FIG. 6C is a front view of the three-way valve assembly of FIG. 6A; and

DESCRIPTION OF A PREFERRED EMBODIMENT OF THE INVENTION

Figure 4:
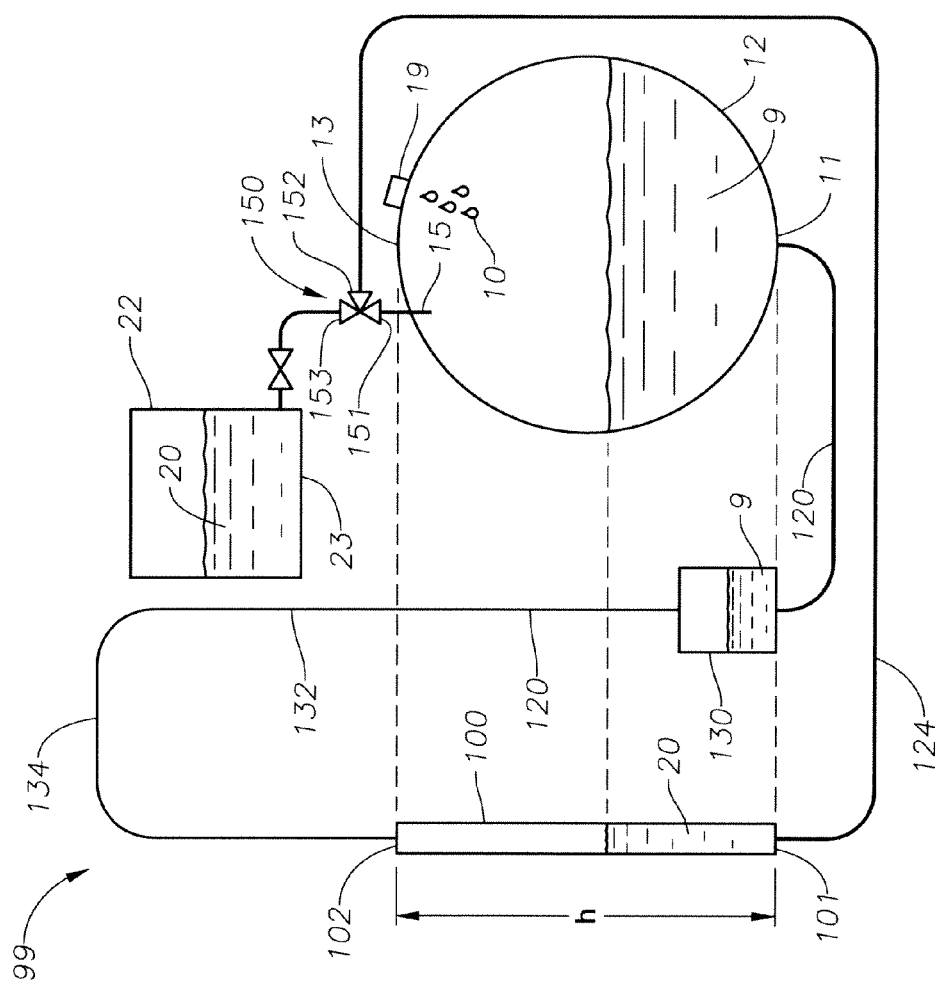
FIG. 4 is a system schematic according to a preferred embodiment of the invention showing major components of the system—a reservoir tank for containing the bulk fluid that is to receive measured amount of additive, a hydrostatic pressure chamber for creating a liquid piston reflecting pressure created by column height of fluid in the reservoir, a calibrated vertical column for receiving and dispensing fluid additive in a measured quantity, an additive storage tank for storing the fluid additive, and a three-way valve for selecting between dispensing and recharge operation.
Figure 6D:
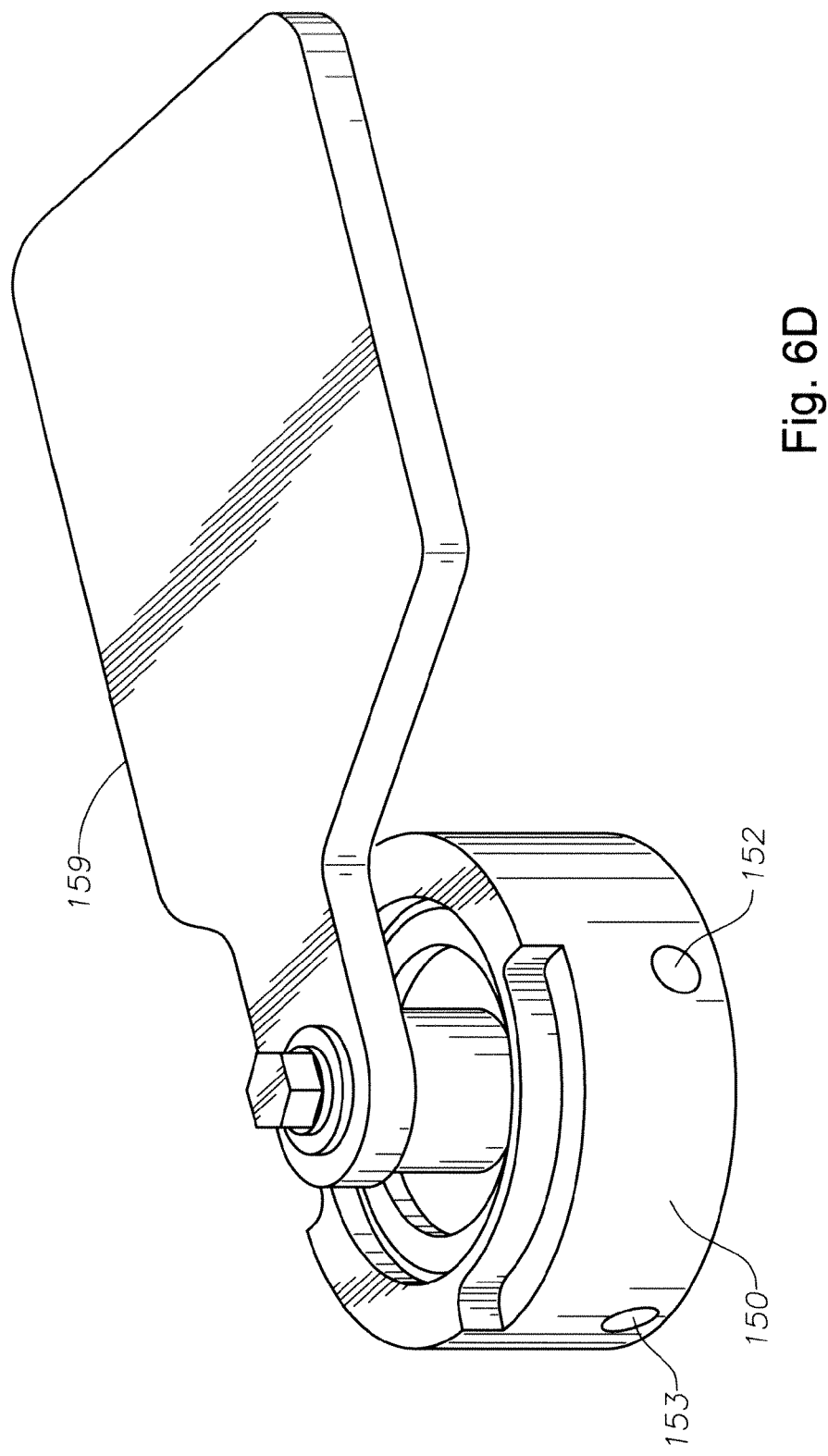
FIG. 6D an isometric perspective view of the three-way activation valve of FIG. A, shown without the mounting apparatus.

An additive dispensing system 99 according to a preferred embodiment of the invention is illustrated in FIG. 4. A dispensing vessel 100, preferably a vertical column, is provided having a gross displacement reflecting a pre-determined ratio to the volume of a fluid reservoir 12, such as a fuel tank. In other words, dispensing vessel 100 is sized to produce the desired additive ratio for injection into reservoir 12. The dispensing vessel or column 100 has a vertical height h exactly the same as that of the adjacent fluid reservoir 12 and is positioned with the top level 102 and bottom level 101 of the vertical column 100 being precisely aligned with the top level 13 and bottom level 11 of the adjacent reservoir 12. The vertical column 100 is filled with fluid 20 that is to be added to the adjacent reservoir 12 by means of an additive storage tank 22 that is positioned so that the bottom level 23 of the additive storage tank is at least as high as the top level 102 of vertical column 100. The top level 102 of the vertical column 100 is connected to the bottom level 11 of the adjacent storage tank 12 by means of a fluid line 120, a first conduit, having included therein a hydrostatic chamber 130, preferably having a diameter greater than the diameter of the vertical column 100. An additional liquid line 124, a second conduit, selectively connects the bottom level 101 of the vertical column 100 to the additive storage tank 12 or to an inlet fitting 15 located at the top level 13 of the adjacent reservoir 12.

As the liquid (e.g., the fuel/additive mixture) level rises in reservoir 12, a small quantity of its fluid contents 9 is introduced into the bottom of hydrostatic pressure chamber 130. Assuming in this operation cycle that calibrated vertical column 100 is completely full of additive 20, a volume of air is now trapped in air line 132 (the portion of flow line 120, a first conduit, between hydrostatic chamber 130 and the top level 102 of vertical column 100). As the fluid level 9 rises in reservoir 12 (such as by filling reservoir 12 with liquid 10 at opening 19), static pressure is exerted on the volume of fluid 9 now trapped in the bottom of hydrostatic pressure chamber 130. Since fluid in the calibrated column 100 and in the bottom of hydrostatic pressure chamber 130 is not compressible, the air in air line 132 is compressed, and pressure is increased in direct proportion to the column pressure exerted on the bottom of hydrostatic pressure chamber 130. The resulting pressure forces fluid 20 from calibrated vertical column 100 through liquid line 124, a second conduit, through a three-way activation valve 150, and through injection line 15, all at a balanced rate relative to the liquid level fill rate in reservoir 12.

The diameter and vertical height of the hydrostatic pressure chamber 130 has a direct relationship to the diameter of the calibrated vertical column 100 used to measure additive 20. Since the liquid 9 in the bottom of the chamber 130 acts like a fluid piston, and the fluid piston compresses the air in the remaining portion of the chamber not containing liquid 9 and the air within the air pressure tube 132, it is advantageous to minimize the volume of air in the chamber 130 by reducing the vertical height of the hydrostatic pressure chamber 130. The ratio of the area of a hydrostatic pressure chamber 130 to that of the calibrated vertical column 100 should be within a range of 10:1 to 16:1, with the hydrostatic chamber 130 having the larger area. Therefore, if the diameter of the calibrated vertical chamber 100 is 1 inch in diameter with an inside area of 0.785 square inches, the corresponding hydrostatic pressure chamber should have a minimum inside area of 7.85 square inches in order to displace the required additive at a proportionate rate.

As filling of reservoir 12 continues, the fluid 20 in calibrated column 100 continues to be evacuated by the pressure in air line 132. When reservoir 12 is completely full, calibrated vertical column 100 is emptied, completing the dispensing of the precise ratio of additive 20 into the reservoir 12. At any time throughout the reservoir filling process, if filling were to stop, the additive 20 level in the calibrated vertical column 100 will stop at the same proportional level.

As fluid 9 (e.g., fuel/additive mixture) is consumed from reservoir 12 at any rate, the fluid column height in the reservoir 12 will be reduced, which correspondingly reduces the pressure exerted on the small quantity of fluid 9 in the bottom of hydrostatic pressure chamber 130. Simultaneously, the compressed air present in the air line 132 and calibrated vertical column 100 is reduced in direct proportion to the level in the reservoir 12, allowing fluid 20 from the additive tank 22 to enter the calibrated vertical chamber 100 at the same rate (as a function of fluid column height) as the fluid 9 exits reservoir 12. Regardless of the time duration of this reservoir emptying process, the calibrated column 100 is refilled in preparation for the next dispensing cycle. With the level of fluid 9 in the reservoir 12 at any given level, the corresponding calibrated quantity of additive 20 is present in the calibrated column 100.

In order for the dispensing system to function as described, it is necessary for the bottom level 101 of dispensing vessel 100 to be alternately connected to the reservoir inlet fitting 15 or the additive container or tank 22, as reservoir 12 is filled and evacuated, respectively. This cyclical operation is effected by three-way valve 150. Three-way activation valve 150 directs additive from calibrated vertical column 100 into the reservoir 12 in a first "dispensing" position while isolating the additive supply tank 22. In a second "re-charge" position, three-way activation valve 150 directs additive 20 from the additive tank 22 back to the calibrated vertical column 100 and isolates the reservoir 12. Three-way valve 150 has a common port 152 that is connected to flow line 124, a second conduit, a first isolable port 151 connected to reservoir inlet 15, and a second isolable port 153 connected to additive container 22. In order to prevent the contents 20 of additive container 22 from freely draining into reservoir 12, three-way valve 150 is arranged so that ports 151 and 153 are never connected to each other or to port 152 at the same time.

Figure 1:
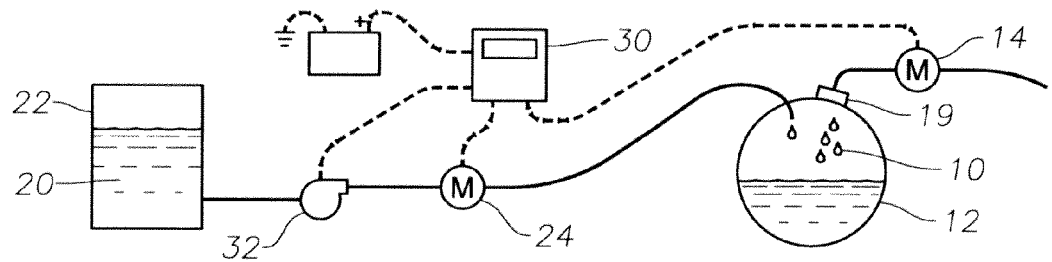
FIG. 1 illustrates a prior art system that measures both the fluid being added to the reservoir and the additive as it is being dispensed and uses an electronic controller to vary pump flow rate for proportioning.
Figure 2:
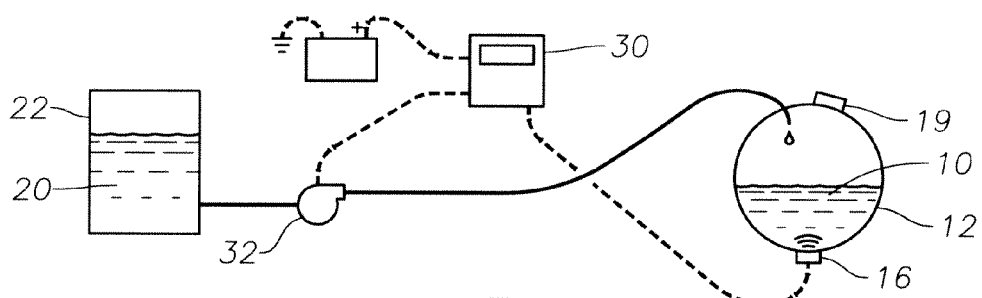
FIG. 2 illustrates a prior art system that measures fluid level in the reservoir, and an on-board calculator determines the amount of additive required and instructs the electric powered pump to deliver the calculated amount of additive required to proportionately treat the fluid in the reservoir.
Figure 3:
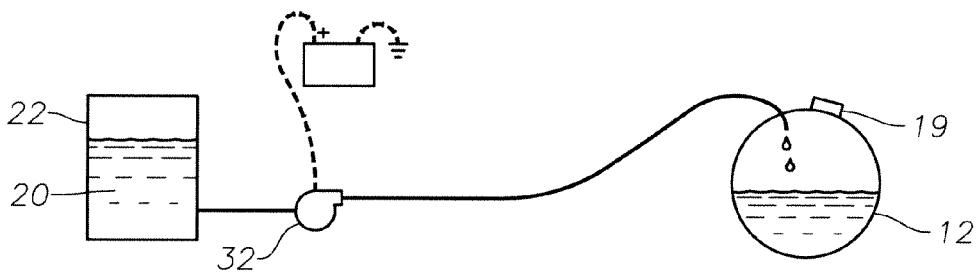
FIG. 3 shows a typical prior art air powered injector that is not proportionate to flow, requiring an operator to stop and start the system as well as determine the total amount of additive required during a specific fueling.
Figure 5:
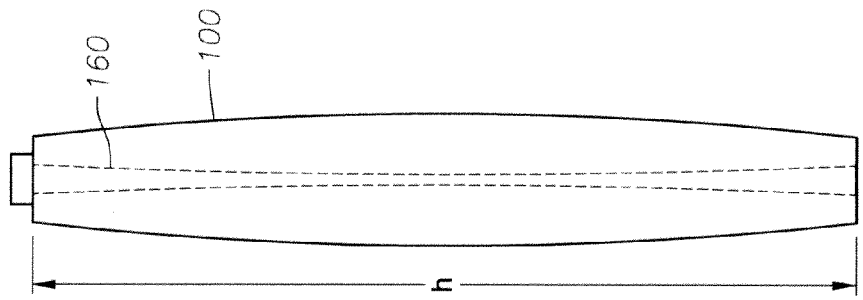
FIG. 5 is an enlarged side view of the calibrated vertical column of FIG. 4 that stores additive equal to the maximum amount or ratio of additive that would be required by the system to be dispensed into the reservoir, showing a calibration rod used to displace volume in the calibrated vertical column when a lesser dosage rate of additive is required.

Referring to FIG. 5, if a different ratio of additive 20 should be required relative to the capacity of reservoir 12, a calibration rod 160 can be inserted into the calibrated vertical column 100, which effectively reduces the capacity of the column 100 corresponding with the required volume of the new ratio. A variety of displacement changes are available for the purpose of changing the desired ratio. When sizing the system initially, the calibrated vertical column 100 must be sized to accommodate the necessary volume of fluid for the maximum desired ratio of fluid relative to the capacity of the reservoir. The size and volume displacement of the calibration rod can be adjusted to match a required ratio. In addition to size and volume of the calibration rod, the shape of the rod may also be adjusted, to reflect varying shaped fuel tanks, therefore making it possible to provide linear injection for a cylindrical tank, for example.

Also, because additive 20 is dispensed as reservoir 12 is filled, and this dispensed additive contributes to the fluid head, which in turn causes additional additive to be dispensed based on the combined solution, a slight non-linearity in dose rate is introduced. This error is greater with greater dose rates and may be compensated for in the design of dispensing vessel 100 and/or displacement member or calibration rod 160.

In a preferred embodiment, the calibrated vertical column 100 is the same height as the corresponding height of the reservoir 12. The column 100 is fixed to the installation either on the end of the reservoir 12 or on a structure adjacent to the reservoir 12 so that the top level 102 of the column 100 and the bottom level 101 of the column 100 correspond exactly to the top and bottom levels 13, 11 of the reservoir 12.

A portion 134 of the air pressure line 132 preferably extends beyond the top level 102 of the calibrated vertical column 100 to a distance that just exceeds the top of the additive tank 22. This prevents additive 20 from reaching the hydrostatic pressure chamber 130 during the re-charging process.

The additive tank 22 is preferably located at a height sufficient to assure that the bottom of the tank 22 is no lower than approximately 1 inch above the top level 102 of the calibrated vertical column 100 so as to provide sufficient head pressure to refill the calibrated column 100 during the re-charging process.

Referring to FIGS. 6A-6D, in an embodiments used for trucks, for example, three-way valve 150 is preferably fastened to the reservoir 12 by means of housing 157. Three-way valve 150 covers the tank fill cap 19 by means of operator actuation arm 159. When arm 159 is rotated, it exposes the fill port 19 of the reservoir 12 and activates the system 99 to direct fluid 20 from the calibrated vertical column 100 to the reservoir 12 while the reservoir is being filled with fluid 10.

Activation arm 159 is preferably spring loaded to cover lever fill opening 19 by default and must be rotated counterclockwise to expose fill cap 19. Fill cap 19 is removed while holding operator 159 clear of the reservoir opening. With arm 159 rotated, three-way activation valve 150 isolates the additive tank 22, and connects the bottom of column 100 to the injection point 15. A fuel dispenser nozzle is inserted into the reservoir 12 through fill opening 19 with arm 159 allowed to return against the fill nozzle. Fuel 10 is then delivered into reservoir 12.

When the fill nozzle is removed from the reservoir, and the tank lid is re-installed on the fill port 19, spring loaded arm 159 is allowed to rotate back over the reservoir fill cap 19. Three-way activation valve 150 thus shuts to the fluid path to injection point 15 and simultaneously opens the fluid line between additive tank 22 and the bottom of the calibrated vertical column 100.

From the foregoing, it is evident that the additive dispensing system according to the preferred embodiment of the invention does not utilize conventional pumps or power of any kind other than static pressure found within the components of the system during the process of filling and evacuating the reservoir. The system provides a precise, extremely durable, inexpensive arrangement by which fluids such as additives (e.g., fuel efficiency additives) or disinfectants (e.g., chlorine) can be added to reservoirs of fluid at precise ratios. The system provides smooth, pulse free, continuous, proportionate-to-flow blending of the dispensed fluid.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein.

What is claimed is:

1. A system (99) for dispensing a second liquid (20) proportionally into a first liquid (10), the system (99) comprising:
   a reservoir (12) defining a top level (13) and a bottom level (11) and having an opening (19) at the top level of said reservoir (12) for receiving said first liquid (10);
   a container (22) for holding said second liquid (20), said container (22) defining a top and a bottom, the bottom of said container (22) elevated above the top level (13) of said reservoir (12);
   a dispensing vessel (100) defining a top level (102) and a bottom level (101), said dispensing vessel (100) equal to the height (h) of said reservoir (12) and disposed elevationally level therewith;
   a hydrostatic chamber (130) defining a top and a bottom, the bottom of said hydrostatic chamber (130) fluidly coupled to the bottom level (11) of said reservoir (12), the top of said hydrostatic chamber (130) fluidly coupled to the top level (102) of said dispensing vessel (100);
   a three-way valve (150) having first, second and third ports (152, 151, 153), said container (22) fluidly coupled to said third port (153), said bottom level (101) of said dispensing vessel (100) fluidly coupled to said first port (152), and the top level (13) of said reservoir (12) fluidly coupled to said second port (151), a first valve position connecting said first port (152) and said second port (151) while isolating said third port (153) and a second valve position connecting said first port (152) and said third port (153) while isolating said second port (151).

2. The system (99) of claim 1 wherein:
   said three-way valve (150) is mounted to said reservoir (12); and
   said three-way valve (150) includes an operator (159) that selectively covers a fill opening (19) of said reservoir (12).

3. The system (99) of claim 1 wherein:
   said dispensing vessel (100) is a calibrated vertical column.

4. The system (99) of claim 1 further comprising:
   a calibrated displacement member (160) removably installed in said dispensing vessel (100).

5. A system (99) for proportionally dispensing a liquid comprising:
   a reservoir (12) for receiving a first liquid (10) into which a proportional dosage of a second liquid (20) is dispensed;
   said reservoir (12) defining a bottom surface (11) and a top surface (13);
   a container (22) for storing said second liquid (20), said container (22) elevated above said top surface (13) of said reservoir (12);
   a dispensing vessel (100) for transferring said second liquid (20) from said container (22) into said reservoir (12), said dispensing vessel (100) defining a bottom surface (101) and a top surface (102);
   a first conduit (120) connecting the bottom surface (11) of said reservoir (12) to the top surface (102) of said dispensing vessel (100); and
   a second conduit (124) connecting the bottom surface (101) of said dispensing vessel (100) to said reservoir (12) and said container (22), said second conduit (124) defining first and second mutually exclusive flow paths, said first flow path defined between the bottom surface (101) of said dispensing vessel (100) and the top surface (13) of said reservoir (12) and said second flow path defined between said container (22) and the bottom surface (101) of said dispensing vessel (100);
   whereby an increased head resulting from an addition of said first liquid (10) to said reservoir (12) urges via said first conduit (120) a proportional volume of said second liquid (20) to be dispensed from said dispensing vessel (100) into said reservoir (12) via said first flow path of said second conduit (124), and
   a decreased head resulting from an evacuation of said reservoir (12) urges via said first conduit (120) said second liquid (20) to flow from said container (22) to said dispensing vessel (100) via said second flow path of said second conduit (124).

6. The system (99) of claim 5 wherein:
   said reservoir (12) is characterized by a cross-sectional area that varies with height (h); and
   said dispensing vessel (100) has a vertical profile that varies with height (h) so that a fixed volume of said second liquid (20) per unit volume of said first liquid (10) is dispensed into said reservoir (12) at all points between the bottom surface (11) of the reservoir and the top surface (13) of the reservoir.

7. The system (99) of claim 5 wherein:
   said bottom level (101) of said dispensing vessel (100) is disposed at the same elevation as the bottom surface (11) of said reservoir (12);
   said top surface (102) of said dispensing vessel (100) is disposed at the same elevation as the top surface (13) of said reservoir (12); and
   a portion (134) of said first conduit (120) is elevated above said container (22).

8. The system (99) of claim 5 wherein:
   said dispensing vessel (100) is a calibrated vertical column.

9. The system (99) of claim 5 further comprising:
   a displacement member (160) disposed in said dispensing vessel (100), whereby the presence of said displacement member (160) in said dispensing vessel (100) lowers the dosage rate of said second liquid (20) per unit volume of said first liquid (10).

10. The system (99) of claim 9 wherein:
said reservoir (12) is characterized by a cross-sectional area that varies with height (h); and
said displacement member (160) has a vertical profile that varies with height (h) so that a fixed volume of said second liquid (20) per unit volume of said first liquid (10) is dispensed from said dispensing vessel (100) containing said displacement member (160) at all points between the bottom surface (11) of the reservoir and the top surface (13) of the reservoir.

11. The system (99) of claim 5 further comprising:
a hydrostatic chamber (130) disposed within said first conduit (120), said chamber (130) defining a bottom surface that is connected to the bottom surface (11) of said reservoir (12) and a top surface that is connected to the top surface (102) of said dispensing vessel (100).

12. The system (99) of claim 11 wherein:
said hydrostatic chamber (130) is characterized by an average horizontal cross-sectional area that is greater than an average horizontal cross-sectional area of said dispensing vessel (100).

13. The system (99) of claim 12 wherein:
a ratio of the average horizontal cross-sectional area of said hydrostatic chamber (130) to the average horizontal cross-sectional area of said dispensing vessel (100) ranges between 10:1 and 16:1.

14. The system (99) of claim 5 further comprising:
a three-way valve (150) disposed in said second conduit (124) so as to selectively enable said first or second flow path.

15. The system (99) of claim 14 wherein:
said three-way valve (150) has a first port (152) connected to the bottom surface (101) of said dispensing vessel (100), a second port (151) connected to said reservoir (12) and a third port (153) connected to said container (22);
said three-way valve (150) includes an operator (159) to position said three-way valve (150) in a one of a first flow path position, in which said first port (152) is in fluid communication with said second port (151) and said third port (153) is isolated, and a second flow path position, in which said second port (151) is isolated and said first port (152) is in fluid communication with said third port (153).

16. The system (99) of claim 15 wherein:
said reservoir (12) includes a fill opening (19) near said top surface (13) of said reservoir (12) for filling said reservoir (12) with said first liquid (10); and
said three-way valve (150) is coupled to said reservoir (12) so that said operator (159) obstructs access to said fill opening (19) when said operator (159) is positioned in said second flow path position and said operator (159) is clear of said fill opening (19) when said operator (159) is positioned in said first flow path position.

17. A method for proportionally dispensing a first liquid (20) into a second liquid (10) comprising the steps of:
providing a reservoir (12) containing said second liquid (10);
providing a dispensing vessel (100) having a height and elevation equal to that of the reservoir (12);
coupling the top of said dispensing vessel (100) to the bottom of said reservoir (12) so that fluid head in said reservoir (12) pressurizes said dispensing vessel (100);
fluidly coupling the bottom (101) of said dispensing vessel (100) to a container (22) having said first liquid (20) stored therein;
filling said dispensing vessel (100) with said first liquid (20) from said container (22) by lowering the pressure in said dispensing vessel (100) by draining said reservoir (12);
fluidly coupling the bottom (101) of said dispensing vessel to the top (13) of said reservoir (12); and
dispensing said first liquid (20) from said dispensing vessel (100) into said reservoir (12) by raising the pressure in said dispensing vessel (100) by filling said reservoir (12) with said second liquid (10).

18. The method of claim 17 further comprising the steps of:
installing a solid displacement member (160) into said dispensing vessel (100) to reduce a dosage rate.

19. The method of claim 17 further comprising the steps of:
before filling said reservoir (12) with said second liquid (10), fluidly coupling the bottom (101) of said dispensing vessel to the top (13) of said reservoir (12) by actuating an operator (159) of a three-way valve (150) to expose a fill opening (19) of said reservoir (12).

20. The method of claim 19 further comprising the step of:
after filling said reservoir (12) with said liquid (10), fluidly coupling the bottom (101) of said dispensing vessel (100) to said container (22) by actuating said operator (159) of said three-way valve (150) to cover said fill opening (19) of said reservoir (12).

* * * * *